(12) United States Patent
Gaydov et al.

(10) Patent No.: US 10,982,978 B2
(45) Date of Patent: Apr. 20, 2021

(54) POSITION SENSOR FOR POSITION DETERMINATION OF AN ACTUATED OBJECT

(71) Applicant: Melexis Bulgaria Ltd., Sofia (BG)

(72) Inventors: Stoyan Georgiev Gaydov, Sofia (BG); Dieter Verstreken, Heusden-Zolder (BE)

(73) Assignee: MELEXIS BULGARIA LTD., Sofia (BG)

( * ) Notice: Subject to any disclaimer, the term of this patent is extended or adjusted under 35 U.S.C. 154(b) by 74 days.

(21) Appl. No.: 16/284,173

(22) Filed: Feb. 25, 2019

(65) Prior Publication Data

US 2019/0265074 A1 Aug. 29, 2019

(30) Foreign Application Priority Data

Feb. 26, 2018 (EP) ..................................... 18158725

(51) Int. Cl.
*G01D 5/244* (2006.01)
*G01D 5/245* (2006.01)
*G01D 21/00* (2006.01)
*B60J 1/17* (2006.01)
*B60J 1/20* (2006.01)

(52) U.S. Cl.
CPC ......... *G01D 5/24428* (2013.01); *G01D 5/245* (2013.01); *G01D 21/00* (2013.01); *B60J 1/17* (2013.01); *B60J 1/20* (2013.01)

(58) Field of Classification Search
CPC .... B60J 1/20; B60J 1/17; G01D 21/00; G01D 5/24428; G01D 5/245
See application file for complete search history.

(56) References Cited

U.S. PATENT DOCUMENTS

| | | | |
|---|---|---|---|
| 8,134,402 B1 | 3/2012 | Lorenz | |
| 8,552,715 B2 | 10/2013 | Semineth et al. | |
| 2011/0018528 A1 | 1/2011 | Semineth et al. | |
| 2019/0077256 A1* | 3/2019 | Onaka | B60K 20/02 |

FOREIGN PATENT DOCUMENTS

| | | | | |
|---|---|---|---|---|
| DE | 102009034664 A1 | | 1/2011 | |
| DE | 102015220839 A1 | * | 4/2017 | ........... G01D 5/2451 |
| EP | 3358312 A1 | | 8/2018 | |

OTHER PUBLICATIONS

Extended European Search Report from EP Application No. 18158725.4, dated Aug. 17, 2018.

* cited by examiner

*Primary Examiner* — Jay Patidar
(74) *Attorney, Agent, or Firm* — Workman Nydegger

(57) ABSTRACT

A position sensor for determining the position of an object, comprising at least one sensing element to transduce a time-varying external signal into an electrical signal; at least one comparator circuit adapted to perform a thresholding operation on the electrical signal being characterized by a hysteresis curve; the position sensor is adapted to provide information relating to the last crossed to store it at least while the position sensor is in an inactive mode and to restore the information to obtain a selected threshold when it is switched from inactive to active mode; and configured such that a transition in an output signal is generated by the thresholding operation if the selected threshold is crossed by the electrical signal and configured to change the selected threshold after it was crossed by the electrical signal.

15 Claims, 7 Drawing Sheets

POSITION SENSOR FOR POSITION DETERMINATION OF AN ACTUATED OBJECT

FIELD OF THE INVENTION

The present invention relates to sensor devices, methods, and sensing systems for position determination of an actuated objects and more particularly devices, methods, and systems for position determination of movable vehicle parts by means of magnetic field sensors subject to rotating magnetic fields.

BACKGROUND OF THE INVENTION

Modern vehicles contain numerous adjustable and movable parts, such as car windows, seats, and electric sunroofs that rely on sensor output to accurately determine the position, direction or speed of motion of the respective movable parts. A motor-driven car window for instance is lifted to a final, closed position by comparing its actual position with the final position and determining the necessary travel distance. Moreover, it is desirable that the driving motor decelerates with the car window approaching the maximum height so as not to damage mechanical parts for fixture and guidance by overstraining them, or that the motor stops driving the car window if a body member, e.g. a hand, is still present in the closing window slit and blocks it.

For determining the position, the number of rotations of the motor may be counted. This may be done using a magnetic field sensor in a rotating magnetic field. Miscounting is caused by the fact that in the currently available magnetic field sensors the threshold during the activation phase (transition from inactive to active mode) is predefined for example (high, low, or even undefined at all) and does not depend on the last threshold being exceeded before the deactivation phase. This could result in missing or extra transitions (depending on the way of processing of the output(s)) during the activation phase (following the deactivation phase) and this in turn leads to miscounting.

Miscounting has been felt a long-standing problem in determining the position of motor-driven objects by means of magnetic field sensors to which a rotating magnetic field is applied. Few attempts were made setting the initial output, however, such systems need extra hardware and complicated processing.

SUMMARY OF THE INVENTION

It is an object of embodiments of the present invention to provide devices, systems, and methods for an accurate determination of position of actuated objects (e.g. motor actuated). It is an advantage of embodiments of the present invention that miscounting errors can be reduced or even excluded.

The above objective is accomplished by a method, devices, and a system according to the present invention.

In a first aspect embodiments of the present invention relate to a position sensor for determining the position of an object. The position sensor comprises:
at least one sensing element adapted to transduce a time-varying external signal into at least one first electrical signal,
at least one comparator circuit adapted to perform a thresholding operation on the at least one first electrical signal being characterized by a hysteresis curve having a high threshold and a low threshold,
wherein the position sensor is adapted to provide information relating to the last crossed threshold of the at least one comparator circuit such that it can be stored at least while the position sensor is in an inactive mode and wherein the position sensor is adapted to restore the information relating to the last crossed threshold to obtain a selected threshold for the at least one comparator circuit when the position sensor is switched from the inactive mode to an active mode,
wherein the position sensor is configured such that a transition in one or more position sensor output signals is generated by the thresholding operation if the selected threshold is crossed by the electrical signal and wherein the position sensor is configured to change the selected threshold after it was crossed by the electrical signal.

It is an advantage of embodiments of the present invention that miscounting is avoided by storing and retrieving the information about the last threshold being crossed. It is thereby advantageous that miscounting is avoided even if the position sensor is unpowered or partially unpowered during the inactive mode.

In embodiments of the present invention the position sensor comprises a non-volatile memory element to store at least the information relating to the last crossed threshold of the at least one comparator circuit.

In embodiments of the present invention the position sensor comprises a volatile memory element to store at least the information relating to the last crossed threshold of the at least one comparator circuit, wherein the position sensor is only partially powered during the inactive mode of the position sensor, and wherein at least the volatile memory element is powered during the inactive mode of the position sensor.

In embodiments of the present invention the time-varying external signal is a time-varying magnetic field.

In embodiments of the present invention the at least one sensing element comprises one or more Hall sensors.

A position sensor according to embodiments of the present invention may further comprise at least one output signal driver circuit adapted to drive the one or more position sensor output signals at one or more output connectors of the position sensor.

A position sensor according to embodiments of the present invention may further comprise a control unit electrically connected to the at least one analog front end circuit and configured to provide at least the information relating to the last crossed threshold of the at least one comparator circuit to the at least one analog front end circuit whenever the position sensor is switched from the inactive mode to the active mode.

In embodiments of the present invention the control unit is configured to provide at least the information relating to the last crossed threshold of the at least one comparator circuit such that it can be stored in the memory element whenever the position sensor is switched from the active mode to the inactive mode and to restore at least the stored information relating to the last crossed threshold of the at least one comparator circuit whenever the position sensor is switched from the inactive mode to the active mode.

A position sensor according to embodiments of the present invention may further comprise an enable input connector adapted to receive external control signals which cause at least the information relating to the last crossed threshold of the at least one comparator circuit to be provided such that it can be stored in a memory element whenever the position sensor is switched from the active mode to the inactive mode and cause the restore of at least the stored information relating to the last crossed threshold of the at least one comparator circuit whenever the position sensor is switched from the inactive mode to the active mode.

In embodiments of the present invention the enable input connector is also adapted to receive external control signals which cause the position sensor to switch between the active mode and the inactive mode.

In embodiments of the present invention the transition in one or more position sensor output signal is a transition between a logical high level and a logical low level.

In a second aspect embodiments of the present invention relate to a position sensor system comprising a position sensor according to embodiments of the present invention and an external signal processing means, wherein the external signal processing means is electrically connected to the position sensor and adapted to receive and further process the position sensor output signals.

A position sensor system according to embodiments of the present invention may further comprise an external memory element, wherein the position sensor or the external signal processing means is adapted to store in and restore from the external memory element at least the information relating to the last crossed threshold of the at least one comparator circuit.

In a third aspect embodiments of the present invention relate to a motor position sensor system comprising a position sensor or a position sensor system according to embodiments of the present invention and a motor, wherein the motor is adapted such that a time-varying external signal is induced when the motor is rotating and wherein the time-varying external signal is transduced by the at least one sensing element into the at least one first electrical signal when the position sensor is in an active mode.

In a fourth aspect embodiments of the present invention relate to a method for determining the position of motor-actuated objects, the method comprising the following steps: transducing a time-varying external signal into at least one first electrical signal using a sensing element when it is in an active mode,
performing a thresholding operation on the at least one first electrical signal, or on a preprocessed version thereof, using a comparator circuit when it is in an active mode, the at least one comparator circuit being characterized by a hysteresis curve having a high threshold and a low threshold, whereby a high threshold is selected for performing said thresholding operation if the last crossed threshold was the low threshold, and whereby a low threshold is selected for performing said thresholding operation if the last crossed threshold was the high threshold,
generating a transition in one or more electrical output signals if one of the two conditions is true: the selected threshold of the at least one comparator circuit is the high threshold and the first electrical signal or preprocessed version thereof is exceeding it, or the selected threshold of the at least one comparator circuit is the low threshold and the first electrical signal or preprocessed version thereof is falling below it,
storing at least the information relating to the last crossed threshold of the at least one comparator circuit at least while the at least one comparator circuit is set to an unenergized state in an inactive mode,
providing back at least the stored information relating to the last crossed threshold of the at least one comparator circuit to appropriately select a threshold of the at least one comparator circuit when the at least one comparator circuit is brought back to an energized state in an active mode.

Particular and preferred aspects of the invention are set out in the accompanying independent and dependent claims. Features from the dependent claims may be combined with features of the independent claims and with features of other dependent claims as appropriate and not merely as explicitly set out in the claims.

For purposes of summarizing the invention and the advantages achieved over the prior art, certain objects and advantages of the invention have been described herein above. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

The above and other aspects of the invention will be apparent from and elucidated with reference to the embodiment(s) described hereinafter.

BRIEF DESCRIPTION OF THE DRAWINGS

The invention will now be described further, by way of example, with reference to the accompanying drawings, in which.

Figure 1:
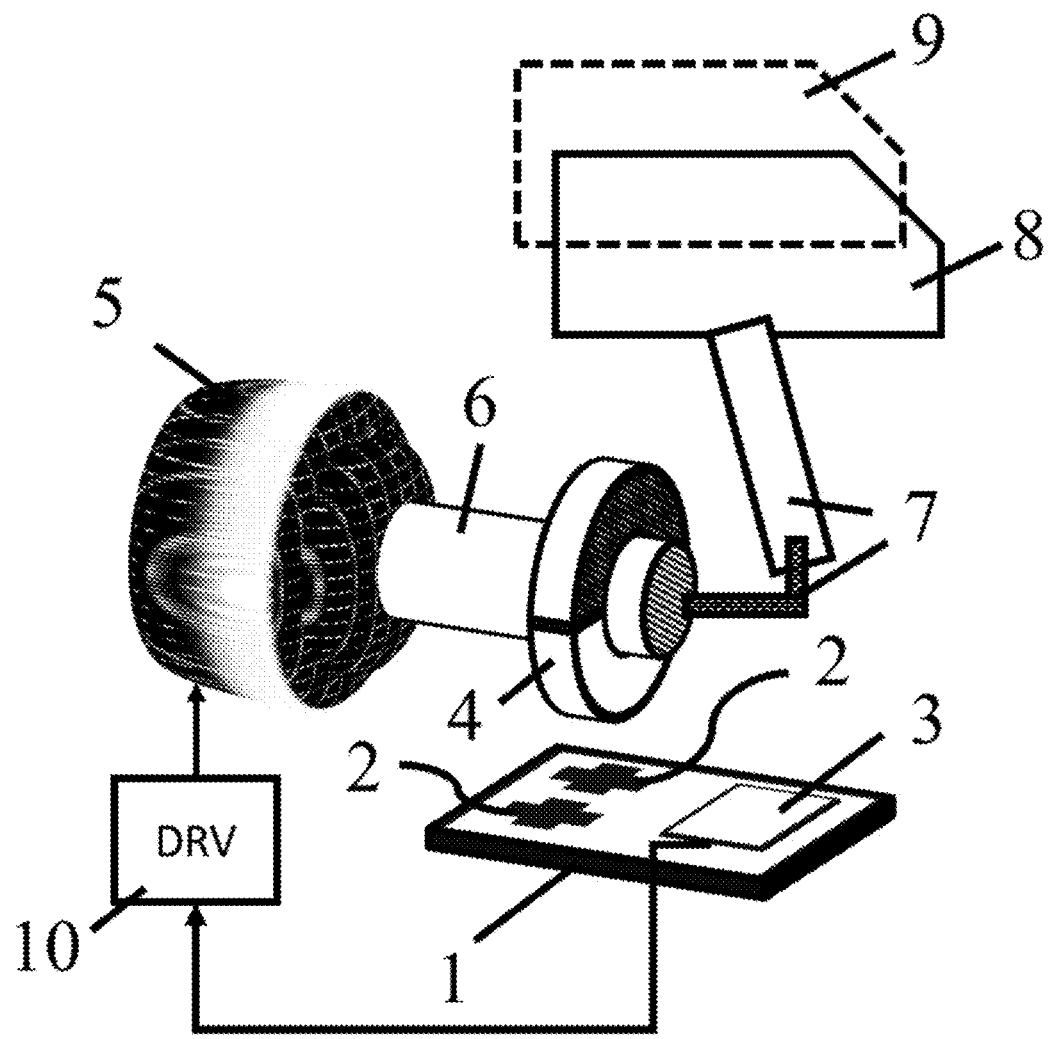
FIG. 1 illustrates a system for lifting and measuring the position of a car window by means of a motor, a rotating ring magnet, and a magnetic field sensor using a position sensor in accordance with embodiments of the present invention.

The drawings are only schematic and are non-limiting. In the drawings, the size of some of the elements may be exaggerated and not drawn on scale for illustrative purposes. The dimensions and the relative dimensions do not necessarily correspond to actual reductions to practice of the invention.

Any reference signs in the claims shall not be construed as limiting the scope.

In the different drawings, the same reference signs refer to the same or analogous elements.

DETAILED DESCRIPTION OF ILLUSTRATIVE EMBODIMENTS

The present invention will be described with respect to particular embodiments and with reference to certain drawings but the invention is not limited thereto but only by the claims.

The terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly, it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

It should be noted that the use of particular terminology when describing certain features or aspects of the invention should not be taken to imply that the terminology is being re-defined herein to be restricted to include any specific characteristics of the features or aspects of the invention with which that terminology is associated.

In the description provided herein, numerous specific details are set forth. However, it is understood that embodiments of the invention may be practiced without these specific details. In other instances, well-known methods, structures and techniques have not been shown in detail in order not to obscure an understanding of this description.

In a first aspect embodiments of the present invention relate to a position sensor for determining the position of an actuated object. Such an object may for example be a motor actuated object. Such an object may for example be the window of a car which is lifted by the motor. However, also other applications where a motor is used to move a mechanical part is also possible (e.g. blinds, sunroofs, mirror, grill shutter, thumb switch, etc).

In embodiments of the present invention the position sensor comprises at least one sensing element 201, 202 adapted to transduce a time varying external signal, which is induced when the motor is rotating, into at least one first electrical signal when the position sensor 1, 301, 401, 501 is in an active mode.

In embodiments of the present invention the position sensor moreover comprises at least one analog front end circuit 31, 32 comprising at least one comparator circuit 33, 34 adapted to perform a thresholding operation on the at least one first electrical signal, during the active mode of the position sensor 1, 301, 401, 501, the at least one comparator circuit 33, 34 being characterized by a hysteresis curve having a high threshold and a low threshold, whereby a high threshold is selected for performing said thresholding operation on said comparator input signal if the last crossed threshold was the low threshold, and whereby a low threshold is selected for performing said thresholding operation on said comparator input signal if the last crossed threshold was the high threshold. The electrical signal may be a processed signal before it is used by the thresholding operation.

In embodiments wherein the position sensor is adapted to provide information relating to the last crossed threshold of the at least one comparator circuit 33, 34 such that it can be stored (e.g. in a memory element 35, 45, 55) at least while the position sensor 1, 301, 401, 501 is in inactive mode. The memory element can be internal or external to the position sensor. The position sensor may comprise the memory element and may be adapted to store the information in the memory element. Alternatively, an external controller/ECU may be storing the information (in its own memory or external memory). It may therefore monitor the output signal(s) provided by the position sensor.

The position sensor is adapted to restore the information relating to the last crossed threshold. The information may for example be restored from the memory element 35, 45, 55. Restoring the information at startup may be achieved by actively recalling it from an internal or external memory element or from an external controller/ECU. Alternatively, the sensor may be configured such that the external controller/ECU can provide the sensor with the information during startup (during power-on time). In embodiments of the present invention the external controller/ECU may also provide supply to the sensor.

The restored information is used to obtain a threshold for the at least one comparator circuit 33; 34 when the position sensor 1; 301; 401; 501 is switched from the inactive mode to the active mode. The obtained threshold is used as selected threshold when performing a thresholding operation when performing one or more initial thresholding operations after switching from inactive to active mode. This may be during the first thresholding operation after switching from inactive to active mode. In some embodiments it may also be in one of the next thresholding operations and it could be also used more than one time (for example for noise rejection, filtering, more complex algorithm for next threshold determination or other purposes). Something like:

In embodiments of the present invention more than one initial thresholding operations may be done using the last crossed threshold information for example for noise rejection, filtering, more complex algorithm for next threshold determination or other purposes.

In embodiments of the present invention the position sensor is configured such that a transition in one or more position sensor output signals 381, 382 is generated by the thresholding operation if the selected threshold is crossed by the electrical signal. In embodiments of the present invention the position sensor is configured to change the selected threshold. In embodiments of the present invention the selected threshold may for example become the high threshold if it previously was a low threshold and vice versa. In embodiments of the present invention the thresholding operation generates a transition if one of the two conditions is true: the selected threshold of the at least one comparator circuit 33, 34 is the high threshold and the comparator input signal is exceeding it, or the selected threshold of the at least one comparator circuit 33, 34 is the low threshold and the comparator input signal is falling below it. The comparator input signal may be the first electrical signal or a preprocessed version thereof. In embodiments of the present invention the thresholding operation may comprise additional processing to determine whether a transition should be generated. In embodiments of the present invention such additional processing may be implemented in a state machine using the signal from the thresholding operation and processing it according some algorithm.

In embodiments of the present invention the information relating to the last crossed threshold of the at least one comparator circuit 33, 34 is applied to the at least one analog front end circuit 31, 32 to appropriately select the low threshold or the high threshold of the at least one comparator circuit 33, 34 when the position sensor 1, 301, 401, 501 is switched from the inactive mode to the active mode.

It is an advantage of embodiments of the present invention that the information about the last threshold being crossed in the active phase preceding the inactive phase is used to set the threshold of the active phase following the inactive phase.

It is an advantage of embodiments of the present invention that miscounting is avoided by storing and retrieving the information about the last threshold being crossed. It is thereby advantageous that miscounting is avoided even if the position sensor is unpowered or partially unpowered during the inactive mode.

Reference is made to FIG. 1 to illustrate how the improved position sensor device 1 may be used in a practical situation. A ring magnet 4, e.g. a dipole or quadrupole ring magnet, is mounted onto a motor shaft 6. A position sensor 1 is placed in proximity to the rotatable ring magnet 4 and is preferably arranged in such a way that a flat, sensitive surface area of the sensor has its surface normal oriented perpendicularly to the axis of revolution of the motor shaft 6. This is advantageous because magnetic field lines emanating from the poles of the rotatable ring magnet 4 then traverse the sensitive surface area at nearly right angles which increases the detectable signal at the magnetic field sensing elements 2 which are essentially extending in the plane of the sensitive surface area of the position sensor 1, e.g. integrated, planar Hall elements. Planar structures for the magnetic field sensing elements 2, such as planar Hall probes, are preferably used in embodiments of the invention, as they are well suited for dense and cost-effective integration on integrated position sensor chips. The motor shaft 6 may be connected to mechanical lifting means 7, e.g. to a window lifting means that positions a car window 8, 9. If the motor 5 is powered, e.g. by receiving a driving signal from a motor driver module 10, the ring magnet 4 starts rotating with respect to a fixed position sensor 1, thereby applying a rotating magnetic field to the position sensor 1. By way of the mechanical lifting means 7, the rotative motion of the motor shaft 6 is transformed into an upward motion of the car window lifting it from a lower position 8 in to an upper position 9 and vice versa, if the sense of rotation is changed by the motor 5. The rotating magnetic field is detected by the magnetic field sensing elements 2 of the position sensor 1, e.g. the integrated, planar Hall probes, and transduced into one or more first electrical signals, e.g. the generated Hall voltages. The rotating ring magnet 4 returns repeatedly to its initial state such that a fixed number of magnetic poles faces the position sensor 1 during each cycle. This naturally translates into a cyclic variation of the transduced one or more first electrical signals, e.g. the induced Hall voltages, with a fixed number of maxima and minima that corresponds to the passage of magnetic north and south poles of the ring magnet 4.

A position sensor 1 is may be provided together with a signal processing means 3, which may or may not be integrated inside the position sensor 1, forming a position sensing system. The signal processing means 3, typically an external electronic control unit (ECU) coupled to the position sensor 1, enables the counting of one or more cyclic variable derivable from the at least one first electrical signal. Such countable, cyclic one or more variables may be an at least one second electrical signal representing the number of cycles, the number of times a maximum or minimum value of the at least one first electrical signal has been reached or crossed, the number of times a high or low threshold value defined with respect to the at least one first electrical signal has been crossed, which may take into consideration the direction of crossing or the previously crossed threshold, etc. Moreover, such countable one or more variables may be signed such that an upward or a downward count results as a function of the sense of rotation selected by the motor 5 or its driver 10. The processing means 3 provided in addition to the position sensor 1 may perform further processing of the count variable(s) with the objective to derive yet another electrical signal indicative of the position of the vehicle part, e.g. the position of the car window 8, 9, the direction, the instant or average speed at which the vehicle part travels, the instant or average acceleration of the motive vehicle part, etc. Therefore, it may be necessary to compare the value of the count variable(s) with entries into a conversion table. Such a conversion table may be provided together with the position sensor's 1 or signal processing means' 3 firmware or may be a look-up table permanently stored within memory elements provided and communicating with the position sensor 1 or the signal processing means 3. The various derived signals may additionally serve as input to a feedback system. A feedback signal may be sent to the motor driver (actuator) 10 or directly determined by the motor driver 10 from the mentioned inputs, and the motor drive signal may be adjusted as a result thereof, which closes the feedback loop. Feedback signals may also be displayed on a user interface device. The feedback loop is advantageous because it enables position and speed control of the vehicle part. In particular, it is possible to implement clamping of the vehicle part once it has reached a maximal or minimal allowed position, e.g. by clamping its associated position signal derived by the position sensing system. A sudden stop of the movable vehicle part, caused for instance by a blocking object such as a hand or arm in the car window slit, brings about a strong negative acceleration which is detectable by the position sensing system or the motor driver 10.

A too strong negative acceleration signal value may then trigger the complete stop of the motor 5, and neither the blocking object, e.g. the hand, nor the vehicle part, e.g. the car window, will be damaged. Speed signals, acceleration signals, and the like, involve a measure of time. The speed signal, for instance, may be obtained by measuring the frequency at which one of the count variables changes, or equivalently counting the number changes in one of the count variables during a specified time interval. Therefore, it is advantageous to provide the position sensing system with an internal or external clock signal that constitutes a time basis for deriving speed signals, acceleration signals, and the like. In a preferred embodiment of the invention, the clock signal is internally provided, e.g. by means of a system clock or clock generator unit, thereby eliminating the need for providing an external clock and dedicated connectors in order to determine speed signals, acceleration signals, and the like. The system clock or clock generator unit may be comprised by a larger unit, e.g. in a controller unit, e.g. a microcontroller, whereby the larger unit may also be adapted to carry out the further processing of the first and second electrical signal as well as all the signals derived therefrom. Under this condition the larger unit is also comprised by the processing means 3.

It is desirable to derive position signals, speed signals, direction signals, etc., which are as accurate as possible. If as explained above, the position signals, speed signals, etc., are derived from at least one of the one or more count variables, as it typically is the case for magnetic field position sensing systems in a rotating magnetic field, obtaining accurate signals implies preventing miscounting. The latter, however, has been a long-standing problem in applications in which the position sensor 1 is temporarily or regularly in an inactive mode of operation (e.g. not powered). This may be the case for position sensors 1 that can be put into a sleep mode or power save mode during which a supply power source is disconnected from the position sensor 1. Movable vehicle parts, such as car windows, sunroofs, car seats, etc., are indeed often remaining in a non-moving condition for long time periods after they have been set to their desired position. It is thus an economical solution and advantage to not permanently power the position sensor 1 and other electronic parts in the feedback loop depending on it. Miscounting usually happens at the time of reactivating the position sensor 1 after a time period during which it was inactive (e.g. during which it stayed completely unenergized). It is a consequence of the fact that most electronic comparator circuits implementing robust thresholding operation on the one or more first electrical signals, for the purpose of counting, are subject to hysteresis effects, e.g. latch-based or transistor-based Schmitt triggers are characterized by state-dependent transitions. Thus, a volatile memory is realized in the processing means 3 or in the position sensor whose initial state at the time the position sensor 1 is reactivated is not well-defined. The resulting ambiguity may be overcome by setting the initial states of the volatile memory elements to a default value, e.g. a logical high or logical low in a two-state memory element, according to a particular boot protocol. If the default value of the initial state is not corresponding to the last occupied state of the volatile memory element before deactivation of the position sensor 1, miscounting errors are introduced and negatively affect the position signal or other derived sensor signals. Other sources of miscounting errors may be identified as thermal drifts, mechanical drifts or vibrations during an active or an inactive mode of the position sensor 1.

Figure 2A:
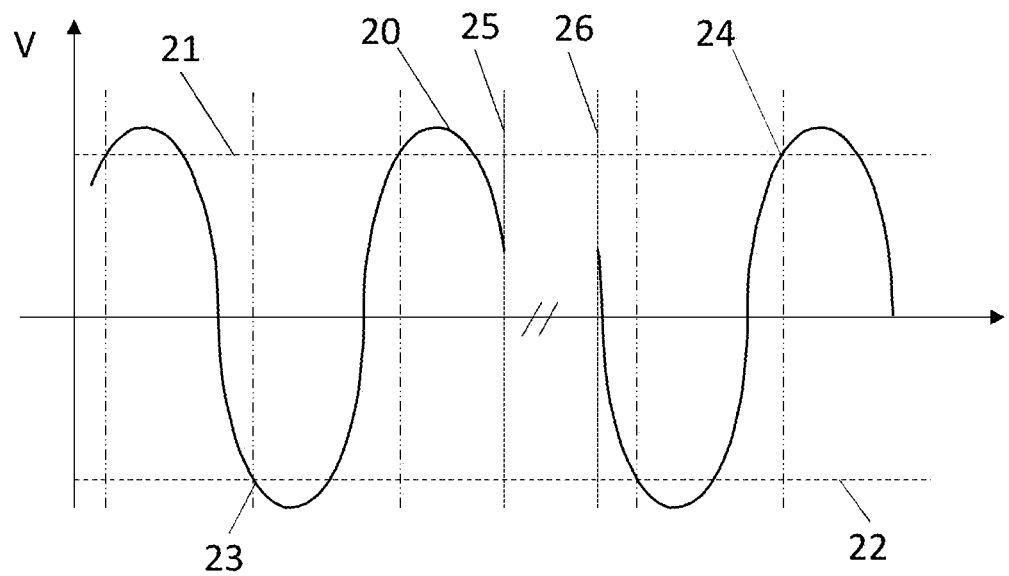
FIG. 2A shows signal diagrams of a time dependent signal representative of the sensed, rotating magnetic flux density and of a binary signal derived therefrom by way of applying a comparison rule.
Figure 2A:
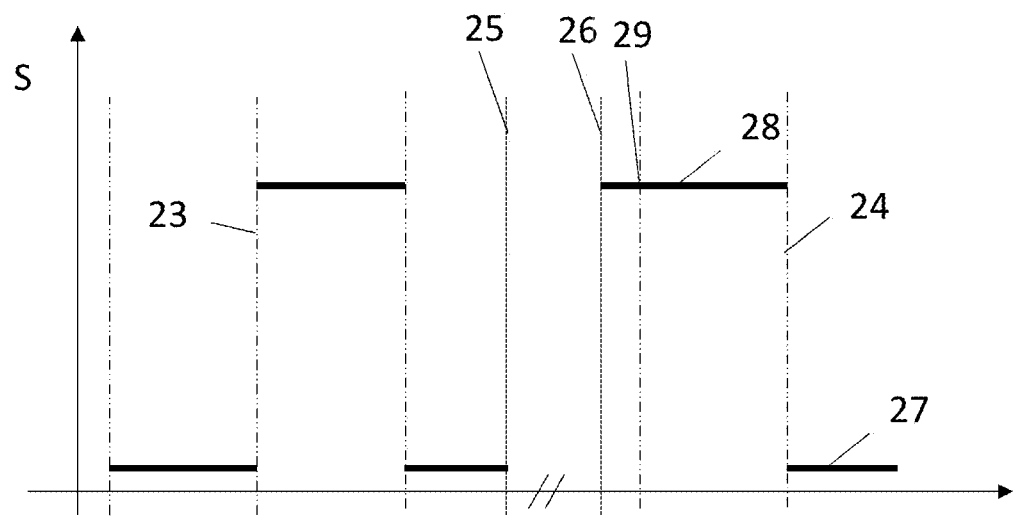

Reference is made to FIG. 2A which shows signal diagrams of the position sensor according to conventional latch-base or switch based Hall sensor technology. This technology typically uses comparator circuits for thresholding which rely on volatile memory elements such as bistable or multistable latches, digital registers, Schmitt triggers, etc., leading to miscounting errors during sensor reactivation due to the lacking initialization of their states/determination of the points on the hysteresis curve. Considering the evolution of a time dependent signal 20, e.g. the magnetic flux density value at the sensing element 2 or the transduced, first electrical signal, e.g. the Hall voltage V or an amplified/filtered version thereof, it is noticed that the signal periodically exceeds a high threshold 21 or falls below a low threshold 22. This happens for instance at moments in time 24 and 23, respectively. According to a comparator or switching rule, a binary signal S is obtained by selecting a logical low level 27 of the binary signal S if the high threshold 21 is exceeded. If the previous logic state of the signal S has already been given by the logical low level 27, the signal S remains in this state. If the time dependent signal 20 is falling below the high threshold 21, again the binary signal S keeps the logical low level 27, unless a low threshold 22 is crossed 23, in which case the binary signal S transitions to a logical high level 28. Similarly, the binary signal S is obtained by selecting a logical high level 28, if the low threshold 22 is crossed. If the previous logic state of the signal S has already been given by the logical high level 28, the signal S remains in this state. If the time dependent signal 20 is rising above the low threshold 22, again the binary signal S keeps the logical high level 28, unless a high threshold 21 is crossed 24, in which case the binary signal S transitions to a logical low level 27. This is, the binary signal S is obtained from the time dependent signal 20 by following its position on a hysteresis curve. For the example given in FIG. 2A it is assumed that the state of the art comparator circuits are initialized to a default value, a logical high level in the present case. It is possible that the initial state is low, but the usual initial state in case of open-drain output (low side driver) is high. The preferred embodiment of the present invention is with initial state high. Therefore, stopping the motor 5 at time 25 will prevent the ring magnet 4 from rotating and the magnetic flux density stays constant as long as the motor moving the vehicle part is inactive. During this time the position sensor 1 may become inactive and may even be disconnected from a power supply source. As a result, the last crossed threshold 21 or 22 may be lost. Starting the motor 5 again at time 26 will put the ring magnet 4 back into its rotating movement and the magnetic flux density again changes cyclically. Together with the starting of the motor 5, the position sensor 1 is reactivated. The initial states of the comparator, however, are set to their default value, a logical high level; the last crossed state—a high threshold 21—is lost in this operation. From the diagrams of FIG. 2A it becomes clear that at the time 26 the position sensor 1 is reactivated, the time dependent signal 20 adopts a value in between the low 22 and the high 21 threshold, i.e. in the hysteresis region. At reactivation the binary signal S is set to logical high level and remains in this state. However, at time 29 a transition should occur in the binary signal S, here from logical low to logical high, if the position sensing was not interrupted during the time 25 to 26. The position sensor having been in the inactive mode during this time, the binary signal S is mistakenly initialized at a logical high value, the default value at power-up, such that a slope in the binary signal S is omitted at time 29. As a consequence, one or more counting variables obtained by counting transitions/edges present in the binary signal S, are lacking one count. In summary, the initial output state after switching from inactive to active phase will be high and the first crossing of the lower threshold that is following the activation of the sensor will not cause a transition in the signal S from low to high state (as it is already in high state).

In position sensors according to embodiments of the present invention, knowledge on the last crossed threshold is stored in a way that the information is not lost during an inactive phase of the position sensor 1. At the time of reactivation of the position sensor 1, the initial states of the comparator circuits are set in accordance to the last crossed threshold instead of choosing a fixed default value. Thus, an update of the position sensor 1 outputs will correctly induce transitions that would have been omitted otherwise; one or more counting variables derivable from the binary signal by counting transitions, edges, etc., will not lack counts.

Figure 2B:
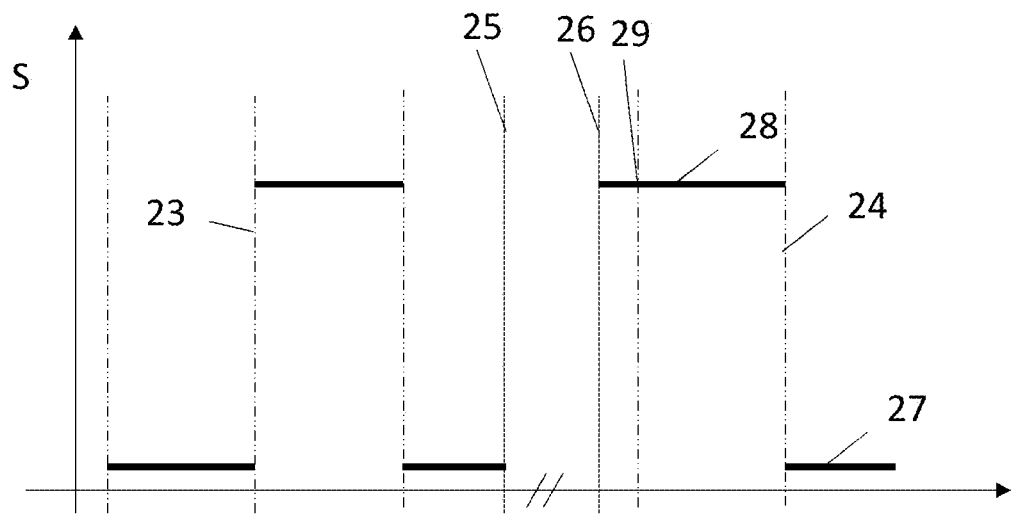
FIG. 2B compares the signal diagram of binary signal derived for a conventional position sensor with signal diagram of binary signal derived for a position sensor according to embodiments of the present invention.
Figure 2B:
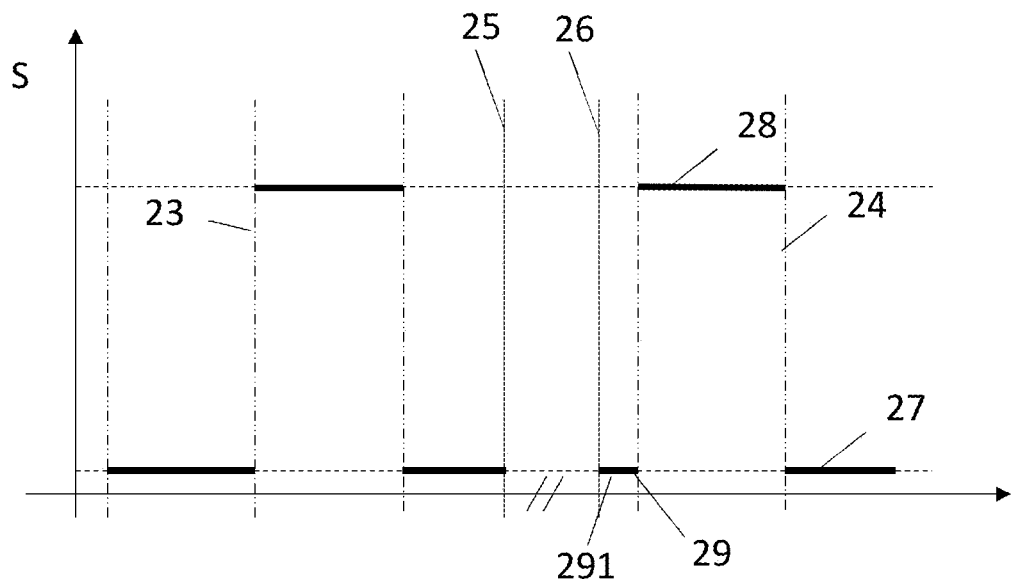

This is shown in FIG. 2B which compares the upper, binary signal diagram S(t) of a position sensor according to conventional sensor technology with the lower, binary signal diagram S(t) of a position sensor according to embodiments of the present invention. Although the position sensing is interrupted during the time 25 to 26, the last crossed threshold—a high threshold 21—is stored in a non-volatile way during the entire inactive phase of the position sensor 1, with the effect that, at the time 26 the position sensor 1 is reactivated, the initial states of its comparator circuits are set to a logical low value 291 in accordance to the last crossed threshold kept in memory. Hence, at time 29 an update of the position sensor 1 correctly outputs a transition of the binary signal S from a logical low value to a logical high value. This transition not being omitted, a counting circuit will not lack any counts in agreement with the claimed invention. Embodiments of the present invention may be programmable in respect of which logical value (high or low) is selected if the time dependent signal 20, e.g. the magnetic flux density value at the sensing element 2 or the transduced, first electrical signal, e.g. the Hall voltage V or an amplified/filtered version thereof, is crossing a high threshold value 21, or a low threshold value 22, respectively. In summary, when the present invention is implemented the initial output state of the signal S will not be high, but it will correspond to the last state—i.e. in this case low. In this way, the first crossing of the lower threshold that is following the activation of the sensor will correctly cause a transition in the signal S from low to high state. In these examples the low state of the signal S is above 0.

In embodiments of the present invention the relationship between the magnetic field and the output level may also be the inverse. When exceeding the high threshold the signal S may transit to a high state and when falling below the low threshold the signal S may transit to a low state. In embodiments of the present invention the relationship between the threshold crossings and the state changes of the output signal is programmable. The threshold signs may be different depending on the implementation and/or on the requirements of the position sensor. In embodiments of the present invention the upper threshold is positive or negative, the lower threshold is positive or negative, in embodiments both thresholds may have one and the same sign, in embodiments the signs of the thresholds may be different signs. In embodiments of the present invention the thresholds and/or their signs are programmable.

Figure 3:
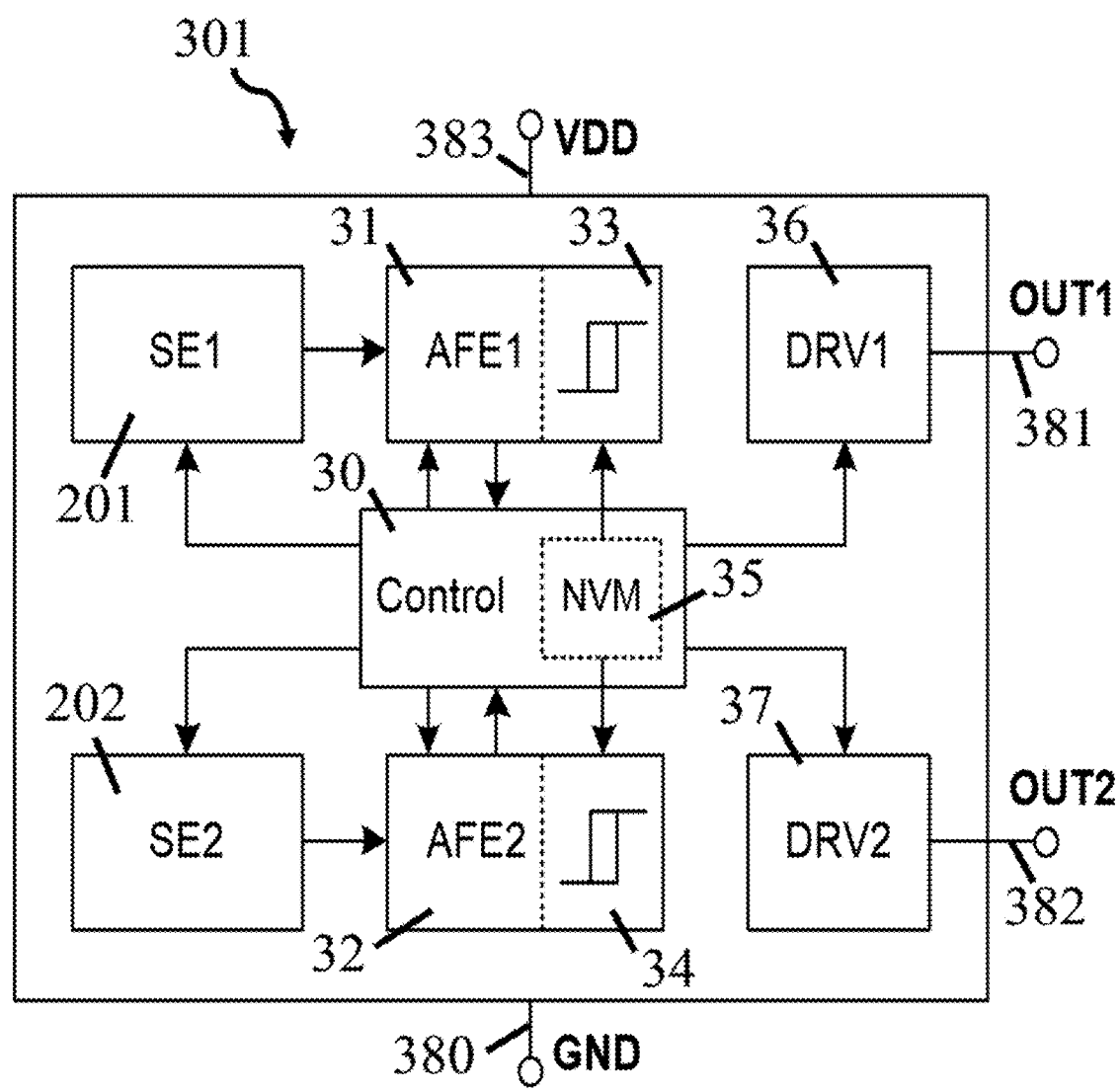
FIG. 3 shows a position sensor device comprising a non-volatile memory element in accordance with embodiments of the present invention.

FIG. 3 shows a schematic drawing of an exemplary embodiment of the present invention. Therein a position sensor 301 comprises two sensing elements 201, 202 the outputs of which are electrically connected to analog front-end circuits 31, 32, respectively. Each analog front-end circuit 31, 32 comprises at least one comparator circuit 33, 34, e.g. an analog voltage comparator. A comparator circuit 33, 34 may, in general, also be one of the following: dedicated analog comparator containing operational amplifiers (with or without feedback), static, dynamic, clocked, switched capacitor, auto-zero, latch-based, e.g. a latch-based Schmitt trigger, comparators optimized for speed (fast/slow), single ended comparators, differential comparators, or combinations of them. It could be even digital, if it is coupled with an appropriate ADC. However, the present invention is not limited to the use of those specific comparator examples and any other suitable comparator circuit may be conceived so as to meet the particular system requirements. Each of the analog front end circuits 31, 32 may also comprise more than just a single comparator so as to realize more complex functions, for example an omnipolar switch and may further comprise preamplifying and amplifying stages, filters, modulators, demodulators, electronic switching devices, e.g. choppers, multiplexing/demultiplexing, sample/hold, averaging, correlated double sampling, correlated triple sampling, correlated multiple sampling, analog-to-digital conversion (ADC), digital-to-analog conversion (DAC), etc. These may be advantageously implemented in position sensing applications which require for example a high gain and low noise amplification of small amplitude first electrical signals. In embodiments of the present invention, not all of the beforementioned signal processing means are necessarily part of the analog front-end circuits 31, 32, but could also be performed by one or more separate signal processing means of the position sensor 1. A suitable signal processing means of the position sensor 1, a component of the control unit 30 for instance, may perform digital signal processing (DSP). Moreover, the signal processing means could be programmable, e.g. programmable gain, offset, bandwidth, etc. The at least one comparator circuits 33, 34, being part of the analog front end circuits 31, 32, are adapted to receive input data from a non-volatile memory element 35, which, in this particular embodiment, is part of a control unit 30. Output signal driver circuits 36, 37 provide a first and a second sensor output signal 381, 382. The skilled person will appreciate that many different options for realizing the output signal drivers 36, 37 exist. Without being limited thereto and depending on the requirements, they may be provided as push-pull, low side (n-channel MOSFET, NPN BJT, JFET, or any other FET, etc.), high side (p-channel MOSFET, JFET, any other FET, PNP BJT, n-channel MOSFET, JFET, any other FET, NPN BJT, etc. combined with a charge pump (CP), etc.), pulse width modulation (PWM), analog voltage output with few levels, analog current output with few levels, analog current output with few levels where the current through the supply pin 383 is used to carry the output information. In this case levels of the voltage applied on the supply pin 383 can be used to carry the input information. This input information can be input for the sensor, for example the last state information from ECU to the sensor if needed. The control unit 30, a digital control logic, e.g. a digital state machine, which may be an integrated microcontroller unit, digital signal processor, microprocessor, or the like, is adapted to send out control signals to the sensing elements 201, 202, to the analog front end circuits 31, 32, and to the output signal driver circuits 36, 37. Besides the control unit is adapted to receive and process data sent by the analog front end circuits 31, 32. The position sensor 301 disposes of a signal ground connector 380 and a supply voltage connector 383. In embodiments of the present invention, the signal ground connector 380 and a supply voltage connector 383 are typically provided as ground and supply pins connected to an external power source, e.g. a car battery. The connection to this external power source may be a direct connection, through a switch, relay, dedicated regulator, or even through more complex devices, e.g. external microcontroller, ECU, including a regulator and/or a switch with different operating modes. Supply voltages may range from 3V to 24V, from 2.5V to 5.5V, from 4.5V to 18V, from 1.5V to 3.6V, or may range in intervals still different from the listed ones depending on the usage and system requirements.

Integrated planar Hall plates are particularly suited for integrated position sensor chips based on magnetic field sensing as they are manufacturable in the same substrate as the rest of the sensor chip, e.g. n-wells defined within a p-substrate. Moreover, it is of advantage to increase the signal-to-noise ratio by placing magnetic flux concentrators adjacent to the Hall plates so as to locally increase the magnetic flux density. The sensing elements 201, 202 can be designed as planar or vertical Hall plates of variable shapes, e.g. circular, wedge, rectangular, square, cross like, octagon, clover-leaf, etc., and may be single element Hall plates or may additionally be arranged into arrays. The latter may, depending on the type of the used sensing element(s), be configured as half bridge or full bridge, embodiments of the present invention not being limited thereto. The sensing elements 201, 202 may be based on different materials—Si, Ge, GaAs, InSb, InAs, InP, SiC, SiGe, Si/SiGe, InGaAs, GaN, AlGaN/GaN, AlGaAs, ZnO, MgZnO/ZnO, graphene, other materials from III, IV or V semiconductor group, compound materials from the III-V semiconductor group, compound materials comprising materials from III, IV or V group combination of the mentioned materials or any other material changing its properties in the presence of a magnetic field or exhibiting Hall-effect. They could be deposited by using micro-transfer printing techniques. In preferred embodiments using Hall-effect sensing elements 201, 202, the sensing elements 201, 202 output a Hall voltage as a first electrical signal. Embodiments of the invention are not restricted to the use of Hall-effect sensing elements though. Indeed the inventive concept is generally also applicable for other type of sensors having one or more sensing elements and comparators with different thresholds (hysteresis), as well as for other type of applications. For magnetic field sensing position sensors other sensing elements may be chosen, for instance magnetotransistors or magnetoresistive sensing elements exploiting the giant magnetoresistance (GMR), the colossal magnetoresistance (CMR), the tunnel magnetoresistance (TMR), the extreme magnetoresistance (xMR), or the anisotropic magnetoresistance (AMR), extraordinary magnetoresistance (EMR), anomalous Hall effect (AHE) and spin Hall effect (SHE) of some materials are alternative, non-limiting choices for the sensing elements 201, 202.

Non-volatile memory 35 may be provided by a memory cell, e.g. a one bit, two bit, four bit, or multiple bit memory cell or memory block, which is capable of storing data permanently such that is retrievable even after an inactive, non-powered mode of the position sensor 301. In particular embodiments of the present invention, the non-volatile memory 35 may be selected from one of the following—EEPROM, EELATCH, FG (floating gate) or SONOS memory, NAND, NOR or 3D flash memory, ferroelectric RAM (FeRAM), resistive RAM (RRAM), magnetoresistive RAM (MRAM), phase change memory (PCM), spin-transfer torque memory (STT-RAM/STT-MRAM), or any other suitable non-volatile memory type. It could be located on the same die as the position sensor 301 chip, in the same package as the position sensor 301, e.g. as two separate dies in a single package, in a separate external package, or integrated in the package of another device in the same system. It is an advantage of multiple bit memory that one and the same information could be stored/kept in few bits, thus allowing for the additional implementation of majority voting, error-correcting codes, e.g. parity check, Hamming codes or Hsiao codes, e.g. for single error correction-double error detection, or allowing for any other redundancy so as to enable correction and/or detection of reading/writing errors. In embodiments of the present invention that also make use of the memory for correction of the read information and/or detection of errors, suitable means therefor could be provided together with the reading/writing of information. Moreover, in some embodiments of the invention, one and the same non-volatile memory 35 could be used to store information relative to the last crossed threshold/last state and also information related to different purposes, e.g. programmable functions of the position sensor 301, e.g. programmable gain, offset, bandwidth, etc. It may also be advantageous to exploit the non-volatile memory 35 to store and restore additional information in respect of the last sensor signal output state, for example the last direction detection state if generated internally in the position sensor 301 or the last speed signal state if generated internally in the position sensor 301. This information could then be used to directly set the position sensor output(s) and/or to be taken into account as last state in the speed or direction signal generation inside the position sensor 301.

In embodiments of the present invention the memory element is big enough to store the information relating to the last crossed threshold redundantly in multiple bits so as to enable the application of error-correcting codes.

In an active mode of the position sensor 301—a magnetic field sensor in a rotating magnetic field, caused for instance by a rotating ring magnet 4—the sensing elements 201, 202 transduce a cyclical change in the magnetic flux density into a first electrical signal, e.g. a voltage signal. It should be noted that in the presence of more than one sensing element, e.g. in the presence of more than one magnetic channel (sensing element combined with analog front end), in embodiments of the invention, more than a single first electrical signal is actually induced. For example two first electrical signals, which are phase-shifted with respect to each other, are induced by the sensing elements 201, 202 in the embodiment according to FIG. 3. Both the first and second magnetic channel of the embodiment according to FIG. 3, and therefore the resulting two first induced electrical signals, are used for obtaining both speed and direction detection, whereby direction detection may be obtained from the underlying phase-shift between the two first electrical signals or processed versions thereof, e.g. a sign of the phase-shift signal may be extracted so as to determine a sense of rotation of the rotating magnetic field, e.g. in a positive or in a negative sense. In preferred embodiments of the invention, the speed and direction detection is obtained by a software running on an external microcontroller or the external control unit (ECU). In alternative embodiments, the speed and direction signal is extracted, e.g. by a software running on the control unit 30, or by a state machine of the control unit 30, inside the position sensor 1 and may be output via dedicated output connectors in addition to the output signals of the magnetic channels. If several magnetic channels are provided with the position sensor 1, it may be possible to provide more than just one speed detection signal or to provide more than just one direction detection signal. Two or more first electrical signals also provide additional redundancy for position sensing, e.g. in the case of failure of one of the sensing elements, and may increase the signal-to-noise ratio. This first electrical signals are applied to the analog front end circuits 31, 32, where they are optionally further processed, e.g. (pre-)amplification, filtering, modulation/demodulation, chopping, multiplexing/demultiplexing, sample/hold, averaging, correlated double sampling, correlated triple sampling, correlated multiple sampling, analog-to-digital conversion (ADC), digital-to-analog conversion (DAC), etc. of the first electrical signals is carried out. The first electrical signals or a processed version of them are then applied to the at least one comparator circuits 33, 34, each having a characteristic hysteresis, e.g. latch-based Schmitt triggers. Each comparator circuit is characterized by a low and a high threshold value. If the first electrical signal amplitudes fall below the low threshold value or rise above the high threshold value, the at least one comparator circuits 33, 34 will transmit this event data to the control unit 30, which in turn sends out control signals to the output signal driver circuits 36, 37 to select and drive a logical low or a logical high, respectively, for the first or a second sensor output signal 381, 382. First electrical signal amplitudes situated within the hysteresis ranges will not cause a change of the first or second output signal 381, 382; the latter will remember and remain in its last occupied state (logical low or logical high), i.e. the state that was selected as a consequence of the first electrical signal amplitudes exceeding the high threshold or falling below the low threshold value.

A large enough separation between the two hysteresis levels typically increases the position sensor's 301 robustness against noise, but also relies on stable input signals to the at least one comparator circuits 33, 34. In the events of adaptive gain regulation, mechanical, thermal, or electronic drifts, or other sources of signal instability, the hysteresis ranges may require updating too. This approach is also taken in DE102009034664 A1 (BROSE FAHRZEUGTEILE [DE]) 27 Jan. 2011, as a measure for counteracting the occurrences of miscounting during an inactive mode of the position sensor 301. Although this approach reduces miscounting errors, it does not exclude them entirely. The exact voltage levels of the logical low and logical high may vary, but should not lead to misinterpretations in subsequent electronic devices. The low and high threshold values of each of the at least one comparator circuits 33, 34 may be different and may be determined as a function of the amplitude ranges of the two first electrical signals with or without amplification, the noise level of the first electrical signals, etc. This has the advantage that the analog front end circuits 31, 32 including the at least one comparator circuits 33, 34 can be optimized to yield a desirable, large enough signal-to-noise ratio during operation. In preferred embodiments of the invention, for which the control unit 30 is a digital finite state machine without any firmware or software executed on it, this optimization may be obtained by means of an external control unit (ECU) or any other suitable external controlling means communicating with the position sensor 1. In alternative embodiments, the control unit 30 may be more complex and include the possibility of running software or firmware running on it, which then carries out the optimization.

Bringing the position sensor 301 into an inactive mode, e.g. by stalling of the vehicle part, by putting the position sensor 301 in a waiting, standby, or sleeping mode, or by disconnecting the position sensor 301 from its power supply source, e.g. by disconnecting the power supply connector 383, initiates the transfer of information encoding the last of either the low or the high thresholds crossed, which is typically remembered by means of the state dependent transitions of the at least one comparator circuits 33, 34 forming a volatile memory, into the non-volatile memory element 35, where it is permanently stored during the inactive (e.g. unenergized phase of the position sensor 301). A later reactivation of the position sensor 301, following the time span it spent in the inactive mode after its deactivation, energizes the position sensor 301 again, e.g. by reconnecting the power supply source, e.g. by reconnecting the voltage supply connector 383, and the encoded information with regard to the last crossed thresholds is retrieved from the non-volatile memory element 35, e.g. by reading out and/or correcting the one or more stored bit values of the non-volatile memory, e.g. the one or more NOR flash memory cells. In embodiments according to FIG. 3, the control unit 30 is used to read out this information and to send a control signal representative of the last crossed thresholds to the analog front-end circuits 31, 32. The analog front-end circuits 31, 32 then set the initial states (low or high state) of the at least one comparator circuits 33, 34 accordingly. In preferred embodiments of the invention, a control signal representative of the last crossed thresholds sent to the analog front end circuits 31, 32 is provided directly to the at least one comparator circuits 33, 34 performing the voltage switching (binary switching rule). However, providing the control signal representative of the last crossed thresholds to a voltage reference block or a dedicated switching block instead, if the voltage reference block or dedicated switching block is configured to perform the voltage switching (binary switching rule), constitutes an alternative, non-limiting example of the present invention. In even another embodiment, the control signal representative of the last crossed thresholds is provided to an additional or already available volatile memory element, if the binary switching signal is generated by this volatile memory element. It is also possible to keep the control signal representative of the last crossed thresholds in the control logic, e.g. the control unit 30, if the voltage switching according to the binary switching rule happens inside the control logic of the position sensor. More generally however, the control signal representative of the last crossed thresholds is provided to the analog front end circuits of the position sensor. In embodiments in which the non-volatile memory is also used to store and share other information, e.g. information on gain selection, offset trimming or any other analog front end (or other internal position sensor) parameter modification/selection including trimming of process deviations, such information may also be broadcast by the non-volatile memory for such purposes after an inactive phase of the position sensor. Correct initial states relating to the hysteresis of the at least one comparator circuits 33, 34 are crucial to ensure their well-defined, predictive behavior. As a consequence the first or second sensor output signal 381, 382 are also set to a logical low or high level depending on the last crossed thresholds and the on currently sensed first electrical signals, i.e. the position sensor 301 is configured to reproduce sensor output signals 381, 382 and internal threshold conditions that governed the position sensor 301 prior to deactivation. Once all the relevant steps for reactivation of the position sensor 301 have been carried out, the sampling of the magnetic flux field continues as usual, i.e. as implemented in an active operating mode of the position sensor 301, and the updated sample is used to determine the selected threshold of the at least one comparator circuits 33, 34, determining whether the control unit 30 sends out or not control signals to the output signal driver circuits 36, 37 so as to generate a transition of the first or second output signal 381, 382, and so on.

In an alternative embodiment, the position sensor 301 of FIG. 3 is further provided with an enable pin connector that is used instead of the control unit 30 to control the save and restore events of the non-volatile memory element 35. The enable pin connector, which controls the save/restore function in respect of the last crossed threshold information, may, for this purpose, be provided through a dedicated pin of the position sensor 301, or may also be shared with some of the existing pins of the position senor 301. In addition, it is possible to assign the save/restore function to a command or commands that are passed through an interface to the external microcontroller or ECU inside a position sensor system comprising the position sensor 301. Besides, save/restore function may also be activated or deactivated by means of detecting a decrease or an increase of the position sensor 301 supply voltage.

In an alternative embodiment, the position sensor 301 of FIG. 3 is further provided with a volatile memory element and in case of partial power-down or disconnection of the voltage supply, the information about last crossed threshold may preferably be kept in the volatile memory element as long as the volatile memory supply voltage is available. Only in case of a complete power-down or disconnection of the voltage supply, the information about last crossed threshold would be written into the non-volatile memory element 35.

In embodiments of the present invention the position sensor further comprises signal processing means suitable for counting transitions between the two logic levels in one or more position sensor output signals such that the number of counted transitions is representative of a position signal of a motor-actuated object.

In embodiments of the present invention the at least one sensing element is adapted to transduce a time varying external signal which is a time-varying magnetic field which is a rotating magnetic field. At least two first electrical signals are transduced in such a way that a signed phase lag between the at least two first electrical signals is detectable and representative of a sense of rotation of the rotating magnetic field.

In embodiments of the present invention the position sensor is an integrated sensor chip.

In a second aspect embodiments of the present invention relate to a position sensor system 400 comprising a position sensor according to embodiments of the present invention and an external signal processing means 41, wherein the external signal processing means is electrically connected to the position sensor and adapted to receive and further process the position sensor output signals.

Figure 4:
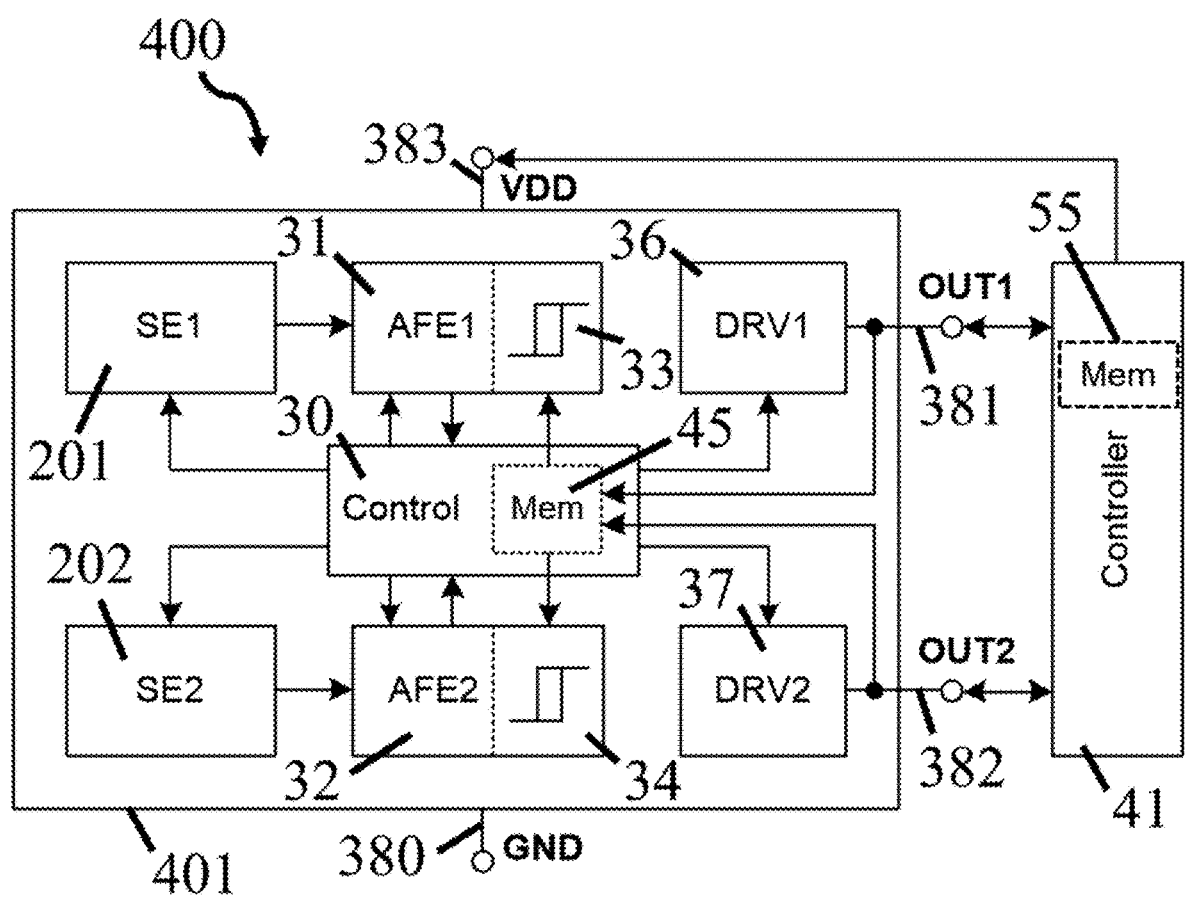
FIG. 4 shows a position sensor device adapted for storing information related to the last crossed threshold in an external memory element in accordance with embodiments of the present invention.

FIG. 4 shows a schematic drawing of a position sensor adapted for storing information related to the last crossed threshold in an external memory element in accordance with embodiments of the present invention. FIG. 4, moreover, shows a position sensor system 400 comprising a position sensor 401 in accordance with embodiments of the present invention. The position sensor system 400 moreover comprises an external memory element 55 and an external controller 41. The position sensor 401 differs from the position sensor 301 of FIG. 3 in that the non-volatile memory element 35 is not provided as part of the control unit 30, e.g. as part of the digital control logic. Instead an internal volatile memory element 45, an external volatile or non-volatile memory element 55, which may be a separate memory element or may be integrated into an external controller 41, e.g. a microcontroller or electronic control unit (ECU) for controlling the sensor system, subsystem, or feedback loop, are provided. The internal volatile memory element 45 may be integral part of the control logic, e.g. the control unit 30 and may in particular be an internal volatile memory selected from one of the following: (digital) latches, flip-flops, (digital registers), static RAM (SRAM), dynamic RAM (DRAM), pseudo-static RAM (PSRAM), or any other volatile type of memory. In present embodiment, the internal memory element 45 acts as a buffer memory, meaning that information on the last crossed threshold stored in the external memory element 55 may first be written into the internal volatile memory element 45 before being used during reactivation of the position sensor 401. In an alternative embodiment, the external memory element 55 may comprise more than one storage element, e.g. at least two hierarchically organized storage elements, for permanently storing the information on the last crossed threshold during an inactive phase of the position sensor 401. For example, the information on the last crossed threshold may first be written to a volatile memory of the ECU from which it can be retrieved most of the time upon reactivation of the position sensor 401. This is advantageous because the ECU is most likely powered continuously and only in the event of lost, decreased or disconnected supply to the ECU, the stored information on the last crossed threshold is transferred into the second non-volatile storage element, thereby saving its write/erase cycles. However, the invention is not limited to such a particular hierarchical external memory element 55; it is possible to choose any non-volatile or volatile memory for performing the tasks of the external memory element 55, the latter of which requires the external memory element 55 to be energized continuously to not accidentally erase information with regard to the last crossed thresholds during an inactive mode of the position sensor 401. The external controller 41 is electrically connected to the sensor output connectors providing the sensor output signals 381, 382, and is also adapted to send or receive data signals. Additionally, there is provided an electrical connection between the sensor output connectors providing the sensor output signals 381, 382 and the external memory element 55 such that the external memory element 55 is capable of receiving the sensor output signals 381, 382.

Similar to what has been described before, the last crossed thresholds, e.g. the last threshold of the comparator 33 crossed by the first electrical signal of the first magnetic channel and the last threshold of the comparator 34 crossed by the first electrical signal of the second magnetic channel, is stored in the external memory element 55, e.g. in an external memory element 55 of an off-chip, external electronic control unit (ECU) 41, prior to powering down and deactivation of the position sensor 401. During a later power-up and reactivation of the position sensor 401, existing pins are made high-impedance for the purpose of reading, e.g. the sensor output connectors providing the sensor output signals 381, 382 set to a high-impedance state, or dedicated pins provided with the position sensor 401 are configured as inputs; the voltage levels representative of the last crossed thresholds are applied to the respective pins during the reactivation phase and read by the control unit 30. It may therefore be practical to provide the control unit 30 with a volatile memory element 45 for temporarily storing the read voltage levels before generating control signals in response thereto and sending them to the analog front-end circuits 31, 32. In this particular embodiment, the ECU 41 is also connected to the supply voltage connector 383 such that the power-up and power-down steps are executed by the ECU 41 too. This has the positive effect that it lightens the burden and complexity of the on-chip control program which is running on the control unit 30 or the complexity of the state machine of the control unit 30. Next the high-impedance state of existing pins, e.g. of the sensor output connectors providing the sensor output signals 381, 382, is left in favor of a low-impedance state such that the respective pins are configured as outputs again. In general, in case the output drivers are open drain the state will depend on the state of the signal to be outputted. If the open-drain output is ON, the state will be low impedance, while if the open-drain output is OFF, the state will be high-impedance. The two sensor output signals 381, 382 are now updated a first time taking into account both the currently applied and transduced magnetic flux field values, e.g. the two first electrical signals, and the last crossed thresholds as provided by the ECU 41 during the reactivation phase of the position sensor 401, e.g. as representative voltage levels applied to the position sensor output connectors configured as inputs, or alternatively applied to other dedicated input pins of the position sensor 401. Subsequent updates of the two sensor output signals 381, 382 are entirely based on the crossed thresholds during the previous sensing or measurement cycle and the currently applied and transduced magnetic flux field values, e.g. the two first electrical signals. A system according to this example should include a pull-up resistor, an appropriate current source used as a pull-up or any other device, functioning as a pull-up. They could be off-chip or integrated in some of the chips in the system also.

In embodiment of the present invention the external memory element 55 is adapted to store information relating to the last crossed threshold of the at least one comparator circuit 33, 34 at least during time periods for which the position sensor is in inactive mode, In embodiments of the present invention an external controller 41 is electrically connected to connectors of the position sensor and to the external memory element, External hereby refers to external to the position sensor but part of the position sensor system 400.

In embodiments the external memory element is part of the external controller.

In embodiments of the present invention the external controller is electrically connected to connectors of the position sensor in such a way that connectors of the position sensor are set to high-impedance by the external controller whenever the position sensor is switched from the inactive mode to the active mode.

In embodiments of the present invention the position sensor system is configured such that whenever the position sensor is switched from the inactive mode to the active mode, the external controller is configured to restore the information relating to the last crossed threshold of the at least one comparator circuit stored in the external memory element and is also configured to apply a voltage signal representative of said retrieved information to connectors of the position sensor that are set to high-impedance.

In embodiments of the present invention the position sensor further comprises a control unit 30 adapted to read voltage signals from connectors of the position sensor that are set to high-impedance whenever the position sensor is switched from the inactive mode to the active mode.

Figure 6:
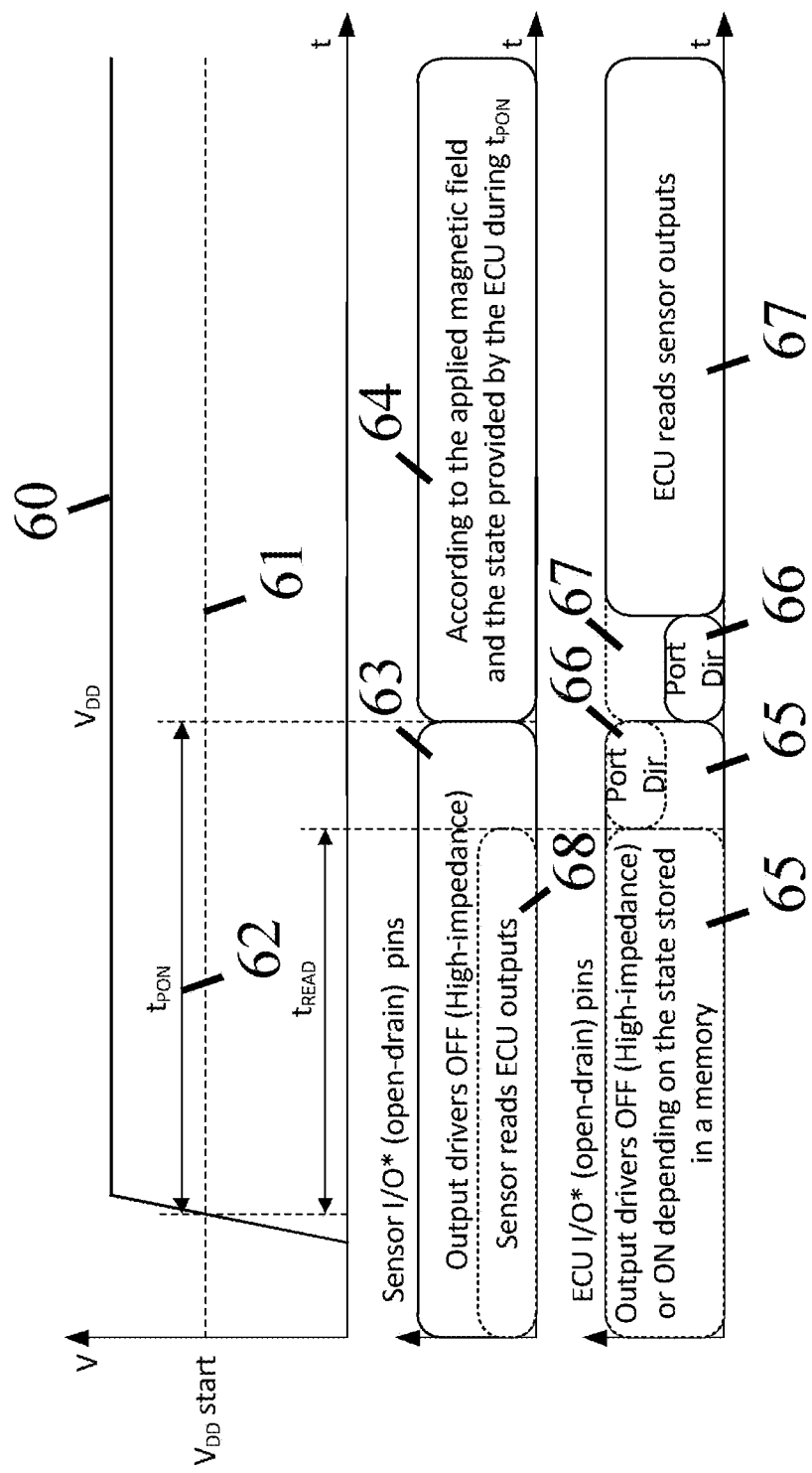
FIG. 6 is a timing diagram of a supply voltage signal, of position sensor output events, and of external controller output events during a reactivation phase of the position sensor.

FIG. 6 further explains how the position sensor input/output (e.g. open drain) pins and the ECU 41 input/output (e.g. open drain) pins are affected by a reactivation of the position sensor 401 switching it from an inactive mode to an active mode. The switching control signal may be sent by the ECU 41 such that a power supply source is reconnected to the position sensor's 401 supply voltage connector 383. In accordance thereto, a supply voltage signal 60 applied to the position sensor's 401 supply voltage connector 383 is ramping up gradually after a small initial delay. At the moment the supply voltage signal 60 crosses a starting threshold 61, a power-on time interval $t_{PON}$ 62 is defined at the end of which the position sensor 401 ought to operate according to the active mode. The supply voltage signal 60 continues ramping up until it reaches its target amplitude to which it is regulated within small tolerances at all later times. At the start of the reactivation phase of the position sensor 401 the position sensor input/output pins are configured as high-impedance 63 and the output signal driver circuits 36, 37 of the position sensor 401 are in an OFF-state. This high-impedance configuration may be a default configuration of the sensor input/output pins whenever the output signal driver circuits 36, 37 are set OFF or may be the result of carrying out instructions received by the control unit 30 at the time the position sensor 401 is switched to the inactive mode or at the time the position sensor 401 is switched back to the active mode. The control unit 30 may thereby itself act according to control signals received by the ECU 41. The ECU 41 input/output pins, which may be implemented as open drain contacts, are in a high-impedance state or in a low-impedance state 65 at the start of the reactivation phase of the position sensor 401, depending on which state is read from the memory element 45, i.e. depending on the last crossed threshold of the comparator circuits 33, 34, and is applied to the ECU 41 input/output pins. A high-impedance state of ECU 41 input/output pins may correspond to a situation in which the ECU 41 output drivers are OFF 65 and a low-impedance state of ECU 41 input/output pins may correspond to a situation in which the ECU 41 output drivers are ON 65. This state of the ECU 41 input/output pins 65 is sensed by the control unit 30 of the position sensor 401 during the $t_{READ}$ time interval such that the last crossed threshold information is transferred back to the position sensor 401, in particular to the analog front end circuits 31, 32 before the power-on time interval 62 has lapsed. It is of advantage to have the last crossed threshold information transferred back to the position sensor before the power-on time interval has lapsed. In this case the first magnetic field sensing can already be taking into account the last crossed threshold information. This allows to obtain the correct transition. The input/output pins configuration of both the ECU 41 and the position sensor 401 changes at the moment the power-on time interval 62 has lapsed. The output signal driver circuits 36, 37 of the position sensor 401 are now driving position sensor output signals 381, 382 according to the results of the threshold action 64 performed by the comparator circuits 33, 34, whereby the latter are taking into account the state provided by the ECU 410 during the power-on time interval 62. In contrast, the ECU 41 input/output pins are rapidly changing port direction 66 so as to be capable of reading 67, and possibly further processing, the position sensor 401 output signals 381, 382. The change of port directions 66 is realized as quickly as possibly since this has the advantage of minimizing the waiting time before a first position sensor 401 sample of the externally applied magnetic field is taken. The reading 67 could incorporate appropriate waiting time for settling of the sensor output signals if necessary.

In the example explained above the input/output pins configuration of both the ECU 41 and the position sensor 401 changes at the moment the power-on time interval 62 has lapsed. However, more variants are possible. FIG. 6 is showing two variants of the communication. One of the variants is implemented such that as soon as the ECU outputs are read 68 by the sensor (period $t_{READ}$ elapsed) the port direction of the ECU can be changed 66 and after doing so, if the period $t_{PON}$ already elapsed 62, the ECU can immediately start reading 67 the sensor output, else it should wait until the period $t_{PON}$ is elapsed 62 before starting to read 67.

Another variant is to switch the ECU port direction after the period $t_{PON}$ 62. The second variant could be a bit slower, but simpler as it waits unconditionally only $t_{PON}$, while the first variant could be a bit faster, but it should wait (count) first $t_{READ}$ and after that depending on the time elapsed for switching of the port direction wait another time or not.

In embodiments of the present invention the reading of the ECU 41 input/output pins and/or the transfer of the last crossed threshold information could be done at the moment the power-on time interval 62 has lapsed, before it or later. In embodiments of the present invention the input/output pins configuration of the ECU 41 and/or the position sensor 401 could be changed at the moment the power-on time interval 62 has lapsed, before it or later. In summary, in embodiments of the present invention the I/O port direction of the ECU and of the position sensor are changed after the power-on time interval $t_{PON}$.

Alternatively, in embodiments of the present invention the I/O port direction of the ECU and of the position sensor are changed during power-on after the sensor has read the ECU output ports. In these embodiments, the ECU starts reading the sensor output ports after changing the port direction as soon as the power-on time interval is elapsed. This may have already yet occurred after changing the port directions.

Figure 5:
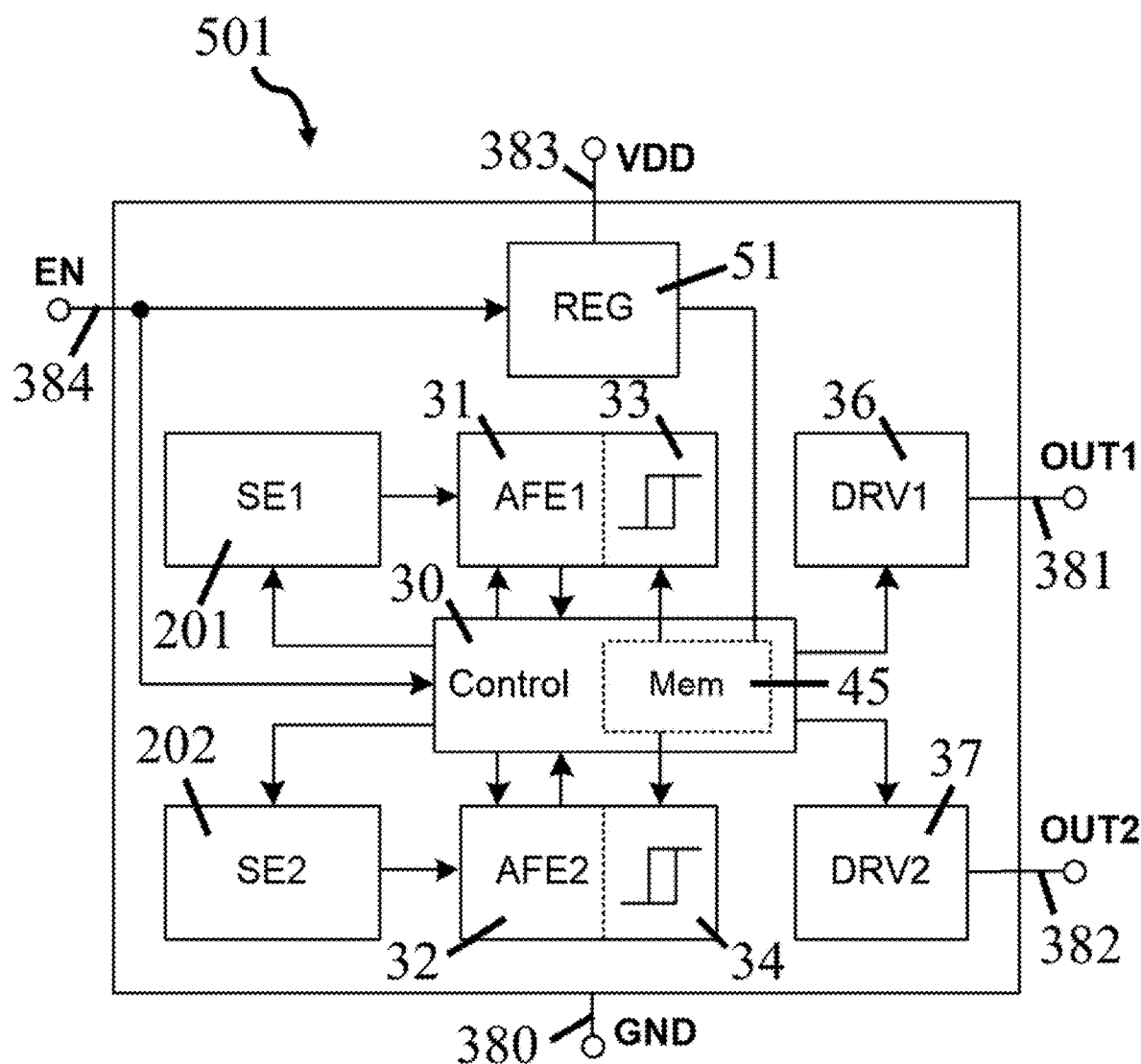
FIG. 5 shows a position sensor device comprising a volatile memory element in accordance with embodiments of the present invention.

FIG. 5 schematically shows an exemplary position sensor in accordance with embodiments of the first aspect of the invention. It discloses a position sensor 501 having two magnetic channels. It differs from the above embodiment in that the non-volatile memory element 35 is not provided. Instead, a volatile memory element 45, which may be part of the control unit 30, is provided. The volatile memory element 45 may comprise a digital register, (digital) latches, flip-flops, static RAM (SRAM), dynamic RAM (DRAM), pseudo-static RAM (PSRAM), or any other volatile type of memory, on which its stored and recalled memory entries may depend. Furthermore an enable pin connector 384 is provided and electrically connected to both the volatile memory element 45, e.g. via the power supply voltage regulator 51, and to the control unit 30. The power supply voltage regulator 51 is also connected to the supply voltage connector 383 of the position sensor 501. It ensures the powering of at least the volatile memory unit 55 during the time the position sensor stays in the inactive mode.

During a deactivation phase of the position sensor 501 and as long as the inactive mode of the position sensor 501 is selected, the information relative to the last crossed thresholds, e.g. the last threshold of the comparator 33 crossed by the first electrical amplitude signal of the first magnetic channel and the last threshold of the comparator 34 crossed by the first electrical amplitude signal of the second magnetic channel, is stored in the on-chip volatile memory element 45, e.g. in the digital register being part of the control unit 30. During a later power-up and reactivation of the position sensor 501, the information on the last crossed thresholds is recovered from the volatile memory element 45 by means of the control unit 30, e.g. the control unit is configured to read the memory entries of the digital register. The control signals based on the read information on the last crossed thresholds are generated accordingly by the control unit 30 and are sent to the respective analog front-end circuits 31, 32. This enables the comparator circuits 33, 34 to select the appropriate low or high threshold value by setting their initial states in accordance to the control signals received from the control unit 30, and by comparing the currently applied and transduced magnetic flux field values, e.g. the two first electrical signals output by the sensing elements 201, 202, to the low and high threshold values. In subsequent updates the two sensor output signals 381, 382 are again entirely based on the crossed thresholds during the previous sensing or measurement cycle and the currently applied and transduced magnetic flux field values, e.g. the two first electrical signals. For this embodiment, it is necessary to provide a power supply at least to the volatile memory element 45 during the entire period of time the position sensor 501 stays in the inactive mode. For this reason, it is advantageous that the enable pin connector 384 controls both the reactivation/deactivation of the position sensor 501 and the power supply voltage regulator 51.

In embodiments of the present invention the position sensor 501 can be selectively set to an energized condition in an active mode or to a partially energized condition in an inactive mode. In embodiments of the present invention the position sensor comprises a volatile memory element to store information relating to the last crossed threshold of the at least one comparator circuit wherein the position sensor is partially powered during inactive mode of the position sensor, and wherein at least the volatile memory element is powered during inactive mode of the position sensor.

In embodiments of the present invention the volatile memory element is a digital register.

In embodiments of the present invention the position sensor further comprises a power supply voltage regulator 51 electrically connected to the volatile memory element and adapted to provide the volatile memory element with a power supply at least during time periods for which the position sensor is set to said partially energized condition in said inactive mode.

In embodiments of the present invention the position sensor further comprises an enable input connector 384 electrically connected to the power supply voltage regulator and adapted to receive external control signals which cause the position sensor to switch between the active mode and the inactive mode, whereby a control signal for switching the position sensor to an inactive mode causes the power supply voltage regulator to interrupt a power supply to the position sensor except for the volatile memory element. The enable input connector 384, which controls the enable/disable function, may, for this purpose, be provided through a dedicated pin of the position sensor 501, or may also be shared with some of the existing pins of the position senor 501. In addition, it is possible to assign the enable/disable function to a command or commands that are passed through an interface to the external microcontroller or ECU inside the position sensor system. Besides, enable/disable function may also be activated or deactivated by means of detecting a decrease or an increase of the position sensor 501 supply voltage.

In embodiments of the invention, the information relating to the last crossed threshold may be written into an internal non-volatile memory element of the position sensor or into an external, volatile or non-volatile memory element of the position sensor system at the time a stop of rotation, e.g. the rotation of a motor shaft, is detected, or at the time a missing activity on some monitored device pin, output connector, or internal signal of the position sensor or position sensor system is detected. Subsequently, the position sensor may be switched into its inactive mode. If the position sensor is switched back into its active mode at a later time, the exact way how the information about the last crossed threshold is used, may differ from embodiment to embodiment, for instance it could be used directly or it could include some additional preprocessing or postprocessing steps. Moreover, the information on the last crossed threshold may be used for other purposes too, different from the main purpose of determining the correct threshold to be used after switching of the position sensor from the inactive to the active mode, e.g. the information restored from the internal or external memory element may additionally be taken into account to directly set the one or more position sensor output signals.

Furthermore, some embodiments of the invention may only account for the last crossed threshold when the externally applied magnetic field is detected inside the hysteresis region, i.e. between lower and upper thresholds. Similarly, some embodiments of the invention may only proceed to a saving of the information on the last crossed threshold state inside an internal memory element of the position sensor or inside an external memory element of the position sensor system if the externally applied magnetic field is detected inside the hysteresis region, i.e. between lower and upper thresholds. In other embodiments of the invention, the saving of the information on the last crossed threshold state inside an internal memory element of the position sensor or inside an external memory element of the position sensor system may be performed in every active phase, at every crossing of one of the thresholds, if there is a request to save, if there is a request for partial or complete power-down (disable, inactive mode), or if the position sensor or position sensor system supply voltage is decreased or disconnected.

If, in embodiments of the invention, the initial threshold value is unknown because the device is started for a first time or if the initial threshold value is unavailable due to missing or suspected erroneous (for example error in the memory) information on the last crossed threshold, then this initial threshold value may be set to a different value, even to 0 mT. It may also be programmable inside the non-volatile memory element, it may depend on other factors, and it may be determined by additional processing of internal or external signals.

In some embodiments of the present invention, more than just the two sensor output signals 381, 382 may be provided at the position sensor output connectors or pins, for instance the two first electric signals of the two magnetic channels are provided together with the two sensor output signals 381, 382, or a logic function (e.g. for obtaining speed and/or direction) of the first and the second magnetic channel is provided together with the two sensor output signals 381, 382, the present invention not being limited to those specific examples. Additionally outputs of any type (analog, digital, voltage, current, push-pull, low/high side, etc.) may be provided, whereby the additional output is generated using only internal information, only external information and/or combination of internal information and external information in respect of the position sensor.

In other embodiments of the invention, the sensor output signals may be provided in a two-wire (VDD pin and GND pin) type of position sensor not requiring any additional signal output connectors of the position sensor. In these cases different supply current levels may be used to represent the different possible output states assigned to different magnetic channels. Moreover, different timing slots may be assigned to the different channels and dedicated communication protocols may be implemented for this purpose.

In some embodiments of the present invention, if the position sensor provides more than one sensing element and more than one sensor output signal, but provides only a single analog front end circuit, multiplexing and demultiplexing means may be provided so as to enable selection of a particular magnetic channel and switching through different magnetic channels.

If, in some embodiments of the invention, two or more magnetic channels are used (sensing element, analog front end, and related outputs), then, according to the particular application needs, some of the magnetic channels may be conceived as regular ones, that is without means for storing and restoring the information on the last crossed threshold, whereby at least one magnetic channel is comprising such storing/restoring means in respect of the last crossed threshold. In general, embodiments of the invention may relate to a position sensor comprising additional magnetic channels (sensing element, analog front end, and related outputs) for reasons of redundancy, increased reliability, increased availability, different axis sensing, more complex processing, extracting additional information like speed or direction detection, or others. In embodiments of the invention for which the position sensor comprises two or more magnetic channels, the sensitivity axis (X, Y, Z) may be different for the different magnetic channels, e.g. one with integrated magnetic concentrators (IMC), others without IMC, or one magnetic channel is using a vertical Hall element whereas the other magnetic channels rely on planar Hall elements.

In embodiments the thresholding action of the at least one comparator circuit 33, 34 is beneficial for removing noise from the sensed and transduced magnetic flux field signals, thus leading to an electrical signal which is a robust, binary representation of the cyclically varying, applied magnetic field. Transitions in the binary sensor output signals 381, 382 are detectable, preferably by an external signal processing means, e.g. the ECU, as steeply rising or falling slopes, e.g. are detectable by a differentiation and thresholding circuit. One or more counting variables representing the position of the vehicle part, e.g. by means of converting the number of counts into a measurable length unit using a conversion table, e.g. a look-up table, may be obtained by further providing an electronic counter module adapted for counting the transitions/edges or by counting pulses of the pulse train—both features are present in the binary sensor output signals 381, 382. Preferably such a counting module is provided with an external signal processing means, e.g. the ECU, electrically connected to the position sensor, but can alternatively achieved inside the position sensor 1 as well. Furthermore, the signal processing means may be adapted to perform additional processing of the sensor output signals, e.g. skipping of some transitions or counting some transitions multiple times. With a proper time reference, speed signals; acceleration signals, etc., may also be obtained starting from the acquired position signal. The required electronic signal processing circuitry of the two or more binary sensor output signals 381, 382 may be provided on-chip as well as off-chip, e.g. by the ECU.

In embodiments of the present invention, the communication of the position sensor with the external signal processing means, e.g. microcontroller/ECU, external memory elements, motor driver (actuator), or any other device in the position sensor system may be practiced according to different communication protocols. Standard protocols like UART, RS232, SPI, I2C, LIN, CAN, SENT, DSI3, PSI5, or any other suitable standard protocol as well as suitable customized protocols may be used. Different commands could be implemented too. The exchange of information, in both directions, should not be limited to only concern information about the last state (crossed threshold). Commands for switching between the active and inactive mode of the position sensor may be implemented, commands for controlling the save/restore for the internal or external memory, commands for control of the actuator, or any other suitable command for control of a device connected in the position sensor system or to exchange information in both or one direction with such a device. Additionally information related to functional safety may be also exchanged. To achieve exchange of information, dedicated pins or output connectors of the position sensor or position sensor system as well as existing pins of the position sensor or position sensor system may be used.

In embodiments of the present invention, the position sensor, the external microcontroller or control unit (ECU), or any other device being part of a position sensor system may be provided in separate packages or in one and the same package or substrate. If they are provided in one and the same package or substrate, they could be on two different dies or on one and the same die. They could be also deposited by using micro-transfer printing techniques.

In some embodiments of the invention, the power supply of the position sensor 1 may be coupled to the power supply of the motor 5 driving the vehicle part. This ensures that inactive phases of the motor 5 conveniently coincide with inactive phases of the position sensor 1.

In particular embodiments of the invention, the motor shaft 6 is provided with clamping, blocking, or self-locking means, e.g. brake shoes, gears or worm drives, which prevent the motor shaft 6 from drifting slightly during an inactive phase as otherwise the possibility exists that a small drift rotation of the motor shaft 6 and the ring magnet 4 occurs which is not detected by the position sensor, thereby compromising the derived position signal.

In some embodiments of the invention, the position sensor may be provided with one or more testing circuits which enable a self-diagnosis of the position sensor.

In a third aspect embodiments of the present invention relate to a motor position sensor system comprising a position sensor or a position sensor system in accordance with embodiments of the present invention and a motor, wherein the motor is adapted such that a time-varying external signal is induced when the motor is rotating and wherein the time-varying external signal is transduced by the at least one sensing element into the at least one first electrical signal when the position sensor 1; 301; 401; 501 is in an active mode.

In a fourth aspect embodiments of the present invention relate to, a method for determining the position of a motor-driven vehicle part is disclosed, in which a magnetic field position sensor 1, 301, 401, 501 and a rotatable magnet 4 are provided. The rotatable magnet 4 is placed in proximity to the position sensor 1, 301, 401, 501 such that the cyclically varying magnetic flux density caused by the rotating magnet 4 is transduced into one or more first electrical signals by means of sensing elements 201, 202 comprised by the position sensor 1, 301, 401, 501. The first electrical signals are fed into analog front end circuits 31, 32 (also comprised by the position sensor 1, 301, 401, 501) comprising comparator circuits 33, 34 having a low and a high threshold 21, 22 separated by a hysteresis, whereby the first electrical signals may be preprocessed by other elements of the analog front end circuits 31, 32, e.g. the first electrical signals may be amplified, modulated, or filtered, prior to applying them to the comparator circuits 33, 34. The at least one analog front end circuit may comprise preprocessing means for preprocessing said at least one first electrical signal into a modified version thereof, the preprocessing means being one or more of the following: amplification, preamplification, filtering, modulation, demodulation, multiplexing, de-multiplexing, sample/hold, averaging, correlated double sampling, correlated triple sampling, correlated multiple sampling, analog-to-digital conversion (ADC), chopping, digital-to-analog conversion (DAC).

The comparator circuits 33, 34 communicate the results of the comparison, which depends both on the currently applied first electrical signals and the previously crossed thresholds of the comparator circuits 33, 34, to a control unit 30 of the position sensor 1, 301, 401, 501, which sends out control signals to the output signal driver circuits 36, 37 of the position sensor 1, 301, 401, 501. The output signal driver circuits 36, 37 generate binary sensor output signals 381, 382 with a transition to one logical level if a high threshold is crossed and following a low threshold being crossed, and with a transition to the other logical level if a low threshold is crossed and following a high threshold being crossed. Upon toggling the position sensor 1, 301, 401, 501 from an active mode into an inactive mode, information relating to the last crossed thresholds is stored in a memory element 35, 45, 55. During a later reactivation of the position sensor 1, 301, 401, 501, toggling it from the inactive mode into the active mode, the information relating to the last crossed thresholds is recalled from the memory element 35, 45, 55 and applied to the analog front end circuits 31, 32 of the position sensor 1, 301, 401, 501 so as to select the appropriate threshold taking into account both the sensed, externally applied magnetic field and the information on the last crossed thresholds that was kept in the memory element 35, 45, 55. For instance, if the last crossed threshold was the low threshold, then compare the currently sensed and sampled, first electrical signal amplitudes to the high threshold. If the currently sensed and sampled, first electrical signal amplitudes are exceeding the high threshold then generate a transition in the binary sensor output signals 381, 382, otherwise keep the current binary sensor output signals 381, 382. If, however, the last crossed threshold was the high threshold, then compare the currently sensed and sampled, first electrical signal amplitudes to the low threshold. If the currently sensed and sampled, first electrical signal amplitudes are falling below the low threshold then generate a transition in the binary sensor output signals 381, 382, otherwise keep the current binary sensor output signals 381, 382. After a first sampling of the externally applied magnetic field, information contained in this sample is used to correctly select the appropriate threshold for the next sampling.

It is an advantage of embodiments of the present invention that information relating to the last crossed threshold of the at least one comparator circuit is only written and/or read from a memory element when strictly necessary, i.e. during a deactivation or reactivation of the position sensor. This allows to increase the lifetime of the memory.

It is an advantage of embodiments of the present invention that the correct transition is obtained and that no transitions are missed by memorizing and retrieving information relating to the last crossed threshold. This allows to obtain a correct sensor output state from the start because the information relating to the last crossed threshold is retrieved at start-up.

While the invention has been illustrated and described in detail in the drawings and foregoing description, such illustration and description are to be considered illustrative or exemplary and not restrictive. The foregoing description details certain embodiments of the invention. It will be appreciated, however, that no matter how detailed the foregoing appears in text, the invention may be practiced in many ways. The invention is not limited to the disclosed embodiments.

Other variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measures cannot be used to advantage. A computer program implementing the steps carried out by the control unit, the external controller, the ECU, etc., in particular the steps carried out during a deactivation or reactivation phase of the position sensor, may be stored/distributed on a suitable medium, such as a solid-state medium supplied, e.g. integrated flash memory, together with or as part of other firmware or hardware, but may also be distributed in other forms, such as via the Internet or other wired or wireless telecommunication systems. Any reference signs in the claims should not be construed as limiting the scope.

The invention claimed is:

1. A position sensor for determining the position of an object, the position sensor comprising:
   at least one sensing element configured for transducing a time-varying external signal into at least one first electrical signal,
   at least one comparator circuit configured for performing a thresholding operation on the at least one first electrical signal being characterized by a hysteresis curve having a high threshold and a low threshold,
   wherein the position sensor is configured for providing which threshold was crossed last, and for storing the last crossed threshold, at least while the position sensor is in an inactive mode, and for restoring the last crossed threshold to select a threshold for the at least one comparator circuit when the position sensor is switched from the inactive mode to an active mode thereby obtaining a selected threshold,
   wherein the position sensor is configured such that a transition in an output signal of the position sensor is generated by the thresholding operation if the selected threshold is crossed by the electrical signal and wherein the position sensor is configured to change the selected threshold after it was crossed by the electrical signal.

2. A position sensor according to claim 1, wherein the position sensor comprises a non-volatile memory element to store the last crossed threshold of the at least one comparator circuit.

3. A position sensor according to claim 1, wherein the position sensor comprises a volatile memory element to store the last crossed threshold of the at least one comparator circuit,
   wherein the position sensor is only partially powered during the inactive mode of the position sensor, and
   wherein at least the volatile memory element is powered during the inactive mode of the position sensor.

4. A position sensor according to claim 1, wherein the time-varying external signal is a time-varying magnetic field.

5. A position sensor according to claim 1, wherein the at least one sensing element comprises one or more Hall sensors.

6. A position sensor according to claim 1, further comprising at least one output signal driver circuit configured for driving the output signal at one or more output connectors of the position sensor.

7. A position sensor according to claim 1, further comprising a control unit electrically connected to at least one analog front-end circuit, comprising the at least one comparator circuit, and configured to provide the last crossed threshold of the at least one comparator circuit to the at least one analog front-end circuit whenever the position sensor is switched from the inactive mode to the active mode.

8. A position sensor according to claim 7, in which the control unit is configured to store the last crossed threshold of the at least one comparator circuit in a memory element whenever the position sensor is switched from the active mode to the inactive mode, and to restore the last crossed threshold of the at least one comparator circuit whenever the position sensor is switched from the inactive mode to the active mode.

9. A position sensor according to claim 1, further comprising an enable input connector configured for receiving external control signals which cause the last crossed threshold of the at least one comparator circuit to be provided and stored in a memory element whenever the position sensor is switched from the active mode to the inactive mode and cause the restore of at least the stored information relating to the last crossed threshold of the at least one comparator circuit whenever the position sensor is switched from the inactive mode to the active mode.

10. A position sensor according to claim 9, in which the enable input connector is also configured for receiving external control signals which cause the position sensor to switch between the active mode and the inactive mode.

11. A position sensor according to claim 1, in which the transition in the output signal is a transition between a logical high level and a logical low level.

12. A position sensor system comprising a position sensor according to claim 1 and an external signal processing means,
   wherein the external signal processing means is electrically connected to the position sensor and configured for receiving and further processing the output signal.

13. A position sensor system according to claim 12 wherein the position sensor comprises a memory element and wherein this memory element is an internal memory element or an external memory element,
   wherein the position sensor or the external signal processing means is configured for storing in and restoring from the internal memory element or from the external memory element the last crossed threshold of the at least one comparator circuit.

14. A motor position sensor system comprising a position sensor according to claim 1 and a motor,
   wherein the motor is configured such that a time-varying external signal is induced when the motor is rotating and
   wherein the time-varying external signal is transduced by the at least one sensing element into the at least one first electrical signal when the position sensor is in the active mode.

15. A method for determining the position of motor-actuated objects, the method comprising the following steps:
   transducing a time-varying external signal into at least one first electrical signal using a sensing element when it is in an active mode,
   performing a thresholding operation on the at least one first electrical signal, using a comparator circuit when it is in the active mode, the at least one comparator circuit being characterized by a hysteresis curve having a high threshold and a low threshold, whereby a high threshold is selected for performing said thresholding operation if a last crossed threshold was the low threshold, and whereby a low threshold is selected for performing said thresholding operation if the last crossed threshold was the high threshold, generating a transition in an output signal if one of the two conditions is true:

the selected threshold of the at least one comparator circuit is the high threshold and the first electrical signal is exceeding it, or the selected threshold of the at least one comparator circuit is the low threshold and the first electrical signal is falling below it, storing the last crossed threshold of the at least one comparator circuit at least while the at least one comparator circuit is set to an unenergized state in an inactive mode, providing back the last crossed threshold of the at least one comparator circuit to appropriately select a threshold of the at least one comparator circuit when the at least one comparator circuit is brought back to an energized state in the active mode.

* * * * *